United States Patent
Raphaeli

(10) Patent No.: US 8,890,677 B2
(45) Date of Patent: Nov. 18, 2014

(54) ACTIVE VIRTUAL FENCE USING MESH NETWORKED RF TAGS

(75) Inventor: Dan Raphaeli, Kfar Saba (IL)

(73) Assignee: Zebra Enterprise Solutions Corp., Oakland, CA (US)

( * ) Notice: Subject to any disclaimer, the term of this patent is extended or adjusted under 35 U.S.C. 154(b) by 1075 days.

(21) Appl. No.: 12/530,223

(22) PCT Filed: Mar. 27, 2008

(86) PCT No.: PCT/IL2008/000424
§ 371 (c)(1),
(2), (4) Date: Jan. 14, 2010

(87) PCT Pub. No.: WO2008/120196
PCT Pub. Date: Oct. 9, 2008

(65) Prior Publication Data
US 2010/0148961 A1    Jun. 17, 2010

Related U.S. Application Data

(60) Provisional application No. 60/908,696, filed on Mar. 29, 2007.

(51) Int. Cl.
*G08B 19/00* (2006.01)
*G08B 13/24* (2006.01)
*G01S 5/02* (2010.01)
*G01S 13/74* (2006.01)

(52) U.S. Cl.
CPC ........... *G08B 13/2494* (2013.01); *G01S 5/0289* (2013.01); *G01S 13/74* (2013.01)
USPC ........ 340/522; 340/554; 340/539.13; 342/28; 342/21

(58) Field of Classification Search
USPC ........... 340/552, 554, 572.4, 539.13; 342/28, 342/21, 61, 99, 114, 115
See application file for complete search history.

(56) References Cited

U.S. PATENT DOCUMENTS

| | | | |
|---|---|---|---|
| 4,124,848 A | 11/1978 | Clark et al. | |
| 5,892,441 A * | 4/1999 | Woolley et al. | 340/539.26 |
| 6,067,044 A | 5/2000 | Whelan et al. | |
| 6,342,847 B1 | 1/2002 | Archuleta et al. | |
| 6,353,390 B1 | 3/2002 | Beri et al. | |
| 6,400,307 B2 * | 6/2002 | Fullerton et al. | 342/28 |

(Continued)

FOREIGN PATENT DOCUMENTS

| WO | WO-03/098528 A2 | 11/2003 |
|---|---|---|
| WO | WO-2006/030422 A2 | 3/2006 |

OTHER PUBLICATIONS

International Search Report and Written Opinion for corresponding International Application No. PCT/IL2008/000424, mailed Nov. 21, 2008.

*Primary Examiner* — Hoi Lau
(74) *Attorney, Agent, or Firm* — Alston & Bird LLP

(57) ABSTRACT

A system capable of monitoring an area and detecting a disturbance with the area. The system has a plurality of ultra-wide band radio frequency tags, each of the tags including a digital signal processing module configured to monitor changes in radio frequency multipath properties of received packets transmitted by at least one other of the tags. Changes in the radio frequency multipath properties may be caused by a disturbance indicative of an object in the vicinity of the tags. A corresponding method is also disclosed.

14 Claims, 4 Drawing Sheets

(56) References Cited

U.S. PATENT DOCUMENTS

| | | |
|---|---|---|
| 6,720,881 B1 | 4/2004 | Halliday |
| 6,985,212 B2 | 1/2006 | Jamieson et al. |
| 7,796,026 B1 * | 9/2010 | Jorgensen et al. ....... 340/539.11 |
| 7,924,160 B1 * | 4/2011 | LaPenta et al. ............ 340/572.4 |
| 8,169,319 B2 * | 5/2012 | Kaplan et al. .............. 340/572.1 |
| 8,193,913 B2 * | 6/2012 | Raphaeli et al. ............. 340/10.2 |
| 2002/0130807 A1 * | 9/2002 | Hall et al. ....................... 342/28 |
| 2003/0174048 A1 * | 9/2003 | McCorkle ................... 340/10.34 |
| 2004/0108939 A1 | 6/2004 | Giunta |
| 2004/0113780 A1 | 6/2004 | Pottratz |
| 2005/0078029 A1 * | 4/2005 | Okamura et al. ................ 342/28 |
| 2005/0147340 A1 | 7/2005 | Tapanes |
| 2006/0033617 A1 | 2/2006 | Wakefield |
| 2006/0047448 A1 * | 3/2006 | Cecil ............................... 702/59 |
| 2006/0152404 A1 * | 7/2006 | Fullerton et al. ................ 342/28 |
| 2006/0197672 A1 | 9/2006 | Talamas, Jr. et al. |
| 2006/0238340 A1 | 10/2006 | Harvey |
| 2007/0012901 A1 | 1/2007 | Mikuski et al. |
| 2007/0090996 A1 * | 4/2007 | Wang ............................. 342/463 |
| 2007/0257831 A1 | 11/2007 | Mathews et al. |
| 2008/0198072 A1 * | 8/2008 | Elwell et al. ................... 342/450 |
| 2009/0079580 A1 * | 3/2009 | Kaplan et al. .............. 340/686.6 |

* cited by examiner

ACTIVE VIRTUAL FENCE USING MESH NETWORKED RF TAGS

RELATED APPLICATIONS

This patent application is a U.S. National Phase Application of PCT/IL2008/000424 filed on Mar. 27, 2008, which claims priority of Provisional Patent Application No. 60/908,696 filed Mar. 29, 2007, the contents of which are incorporated herein by reference.

FIELD AND BACKGROUND OF THE INVENTION

The present invention relates to virtual fences and, in particular, it concerns an active virtual fence using mesh networked RF Tags.

There are many security applications in which a sensitive area must be protected from intruders. A conventional approach is a wall or a fence. However, advances in current technological allow the use of an electronic fence or virtual fence which senses the presence of unwanted activity in the protected area and usually generates a warning.

Current approaches for building a virtual fence include placing an array of control towers, each equipped with movement detection and security radar, cameras or motion detectors. Such as the systems disclosed in U.S. patent application Ser. No. 2006/0033617 to Wakefield and U.S. Pat. No. 4,124,848 to Clark, et al. A similar system was described at the beginning of 2007 by the US Department of Homeland Security with regard to awarding aerospace giant Boeing a contract to provide high-tech methods to catch illegal immigrants along the U.S.-Mexico border. Boeing's "virtual fence" concept includes an estimated 1,800 towers deployed along the border and equipped with cameras and motion sensors. The cost of this project is about 10 billion dollars.

Another approach offered by some companies is a Virtual Fence Passive Multi-Sensor System, which includes a covert, passive device designed to detect human activity independent of a physical obstacle. This Virtual Fence is a sensor array, combining acoustic, seismic and infrared (IR) sensors to detect, locate, and identify human activity in a protected area. The system enables target detection beyond line of sight, such as movements of humans, vehicles and low flying helicopters hidden in ground defilades.

In such a system, the sensors are installed underground, in sealed boxes containing digital signal processors and wireless communications devices, geophones, microphones, IR detectors and power sources. The only element above ground is a concealed camouflaged antenna and IR detector. Each sensor contains a processing unit which performs target identification (ID) and direction finding (DF). The IDDF algorithms enable monitoring and discriminating between diverse activities, such as moving humans, digging and building work, as well as mechanical noises such as approaching vehicles. The system can be implemented to provide early warning for border and perimeter control, tunnel excavation, protection of pipelines and electrical infrastructure, guarding vital installation perimeters as well as monitoring prison fences.

Other previous art virtual fence techniques have been described in U.S. Pat. No. 6,067,044 Whelan, et al., and U.S. Pat. No. 6,342,847 to Archuleta, et al., and U.S. patent application Ser. No. 2006/0197672 to Talamas et al. and No. 2006/0238340 to Harvey. These virtual fences use GPS to determine if a tagged object is outside an allowed boundary. The GPS is used to measure the location of the object and this location is compared to a threshold defining the perimeter of the virtual fence.

Other patents suggest the use earth based transmitters for locating an object. Examples include U.S. patent application Ser. No. 2004/0108939 to Giunta in which the device uses both GPS as well as earth based transmitters to locate itself. U.S. Pat. No. 6,353,390 to Beni et al. uses cellular base stations for location. U.S. patent application Ser. No. 2007/0257831 to Mathews et al. uses CDMA signals from earth based transmitters. U.S. Pat. No. 6,720,881 to Halliday describes a wearable transmitter, an alarm condition is detected when the transmitter, is detected by some receivers in the perimeter. All these solutions require that the tracked object/person will carry a special unit used for location. This requirement is not feasible in security applications in which the objective is to determine the presence of a foreign intruder.

Other suggested techniques for creating a virtual fence include using laser beam or infrared light, such as in U.S. patent application Ser. No. 2007/0012901 to Mikuski et al. and U.S. Pat. No. 6,985,212 to Jamieson et al. in which a fence using infrared light is made, such that an intruder is detected if the beam is broken. Such approaches are possible only for short distance over flat terrain and are dependent on weather conditions.

Two other proposed solutions are provided in U.S. patent application Ser. No. 2005/0147340 to Tapanes that describes fibers that are buried in the ground to detect when there are being stepped on, and U.S. patent application Ser. No. 2004/0113780 to Pottratz which suggests tripwires to detect crossing.

There is therefore a need for a virtual fence using mesh networked RF Tags.

SUMMARY OF THE INVENTION

The Present invention is a virtual fence using mesh networked RF Tags.

According to the teachings of the present invention there is provided, a system capable of monitoring an area and detecting a disturbance with the area, the system comprising a plurality of ultra-wide band radio frequency tags, each of the tags including a digital signal processing module configured to monitor changes in radio frequency multipath properties of received packets transmitted by at least one other of the tags, the changes being caused by a disturbance indicative of an object in the vicinity of the tags.

Embodiments of the system are further provided wherein at least one from the group including at least one of the tags, at least one reader operatively associated with the plurality of tags and a central processor operatively associated with either the reader or the at least one tag, includes a pattern recognition module which classifies the object and determines a location of the object causing the disturbance based on the processes changes in radio frequency multipath properties; wherein at least the central processor is configured to provide information to a user regarding the disturbance; wherein a mesh network is formed between at least some of the plurality of tags; and wherein the mesh network includes at least one of a reader and a central processor operatively associated with the mesh network.

The teachings of the present invention further provide a corresponding method for detecting the entry of an object into a monitored area.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a virtual fence using mesh networked RF Tags.

The principles and operation of a virtual fence according to the present invention may be better understood with reference to the drawings and the accompanying description.

By way of introduction, the present invention provides an Active Virtual Fence Multi-Sensor System, employing wideband RF tags which are capable of mesh networking.

The invention uses the same RF tags used for RFID applications as described in patent applications "Method and system for distance determination of RF tags (PCT/IL2003/000358) and "Communication and distance measurement in an addressed wide-band RFID system" (PCT/IL2005/000967), with additional features which adapt the RF tags to the new applications, without much increase in cost.

The innovative system is based on two concepts.

The first concept is the use of area covering sensors which detect a disturbance indicative of the presence of objects (both moving and not moving) in the area of the sensor using a multipath signature of the received signal. Unlike RADAR which sends a signal and looks for its reflection, the present invention uses only the RF link between two or more nodes such as, but not limited to, tags and readers. No additional RF circuits are needed, which means very low cost devices. As used herein, the term "disturbance" refers to a change in the multipath signature (properties) of the signals received by at least one node in the system.

The second concept is mesh networking of all the Tags in the system together to minimize the need for a dense fixed infrastructure for communicating with the control center. The protocols for implementing an Ad-hoc mesh networking of wireless sensors is known in the art and described in various academic papers. The resulting tag can be implemented on a small single chip, using a very small battery with a life span of several years and without any maintenance. Such a tag is small enough to be concealed inside a small innocent looking stone in the field. The tags can even be spread from the air and immediately form the ad-hoc mesh network between them. In addition, each tag has the ability to measure the round trip delay to its neighbor by exchanging packets as described in patent application PCT/IL2003/000358 "Method and System for Distance Determination of RF Tags".

All such measurements, including the tags identity information are passed through the mesh network until they reach a fixed reader which collects the information. The readers further send their data to a central processor which will build a two-dimensional mapping of the tags as randomly placed to cover the area. Preferably, the (x,y) coordinates of each tag and its nearest neighbors should be stored in each tag.

In some military applications, such tags may be spread by a special kind of missile or bomb that spreads them all over enemy area.

Figures 1, 1A:
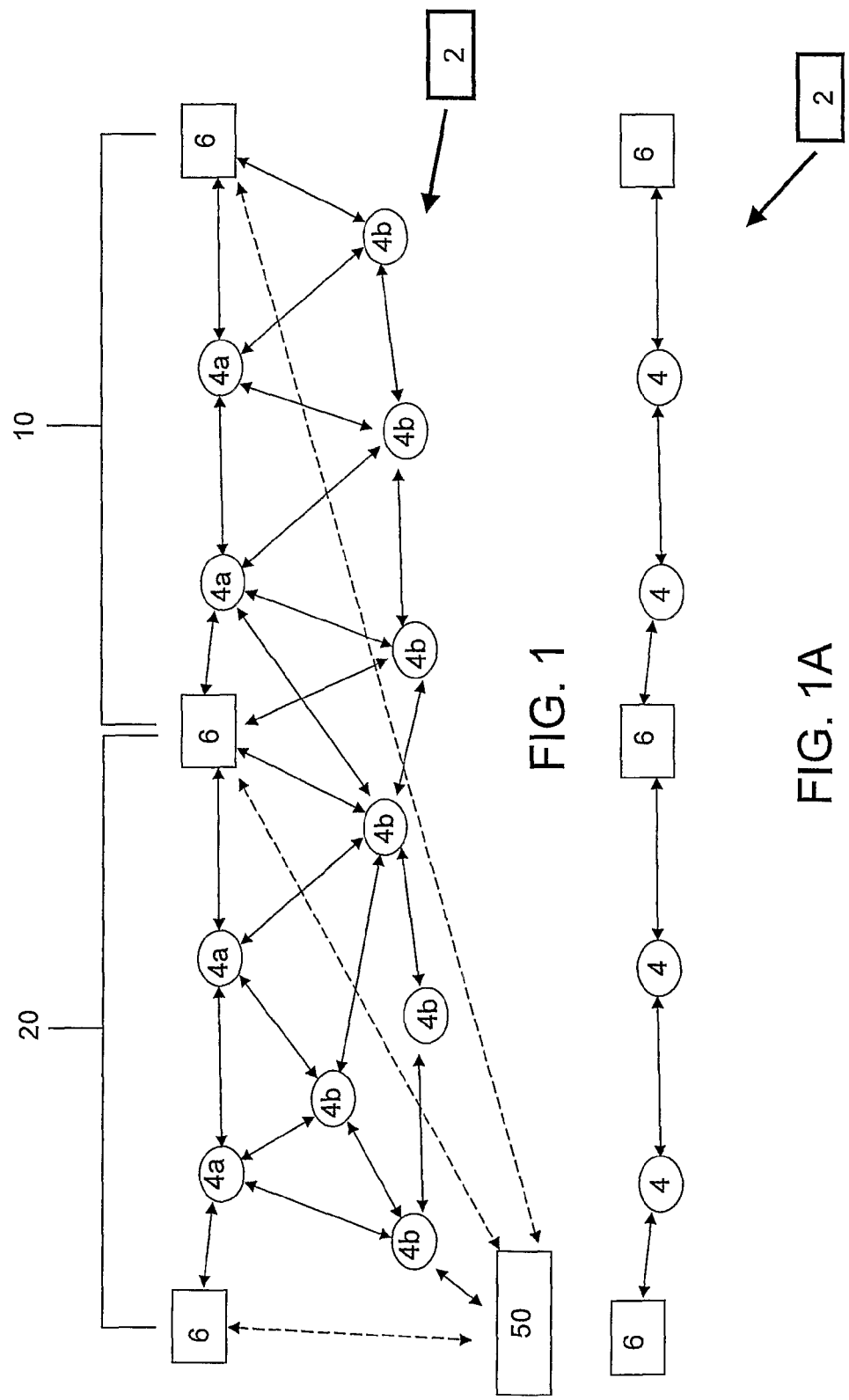
FIG. 1 is a schematic block diagram of a virtual fence constructed and operational according to the teachings of the present invention.
FIG. 1A is a schematic block diagram of a virtual fence in its simplest form constructed and operational according to the teachings of the present invention.

Referring now to the drawings, FIG. 1 illustrates a virtual fence system 2 containing a mesh of tags 4 with one or more fixed readers 6. The virtual fence of FIG. 1 is created by placing a belt of tags along the length of the area to be monitored. The tags 4 can be placed in an orderly fashion such as, by non-limiting example, on some grid as illustrated in section 10, randomly as in section 20 or in a straight line as illustrated in FIG. 1A.

If a straight line pattern is used, a minimum number of tags are necessary. However, distributing the tags in a belt pattern will increase the reliability of the fence since many more tags will have an option to detect an intruder or other disturbance. The wider the belt, the longer the intruder can be tracked. Further, the use of a belt distribution reduces the probability of false alarm. Furthermore, the direction of movement will be more evident by observing the relative timing of the detection. If the first row of tags 4a is first to detect a disturbance and then the second row of tags 4b detects a disturbance, it can be conclude that the object causing the disturbance is moving toward the area of the virtual fence 2. The direction being traveled by the object causing the disturbance can also be determined by monitoring which tags 4 detect the disturbance and the order in which the tags 4 detected the disturbance. This information can not be provided by the virtual fence of FIG. 1A.

Figure 2:
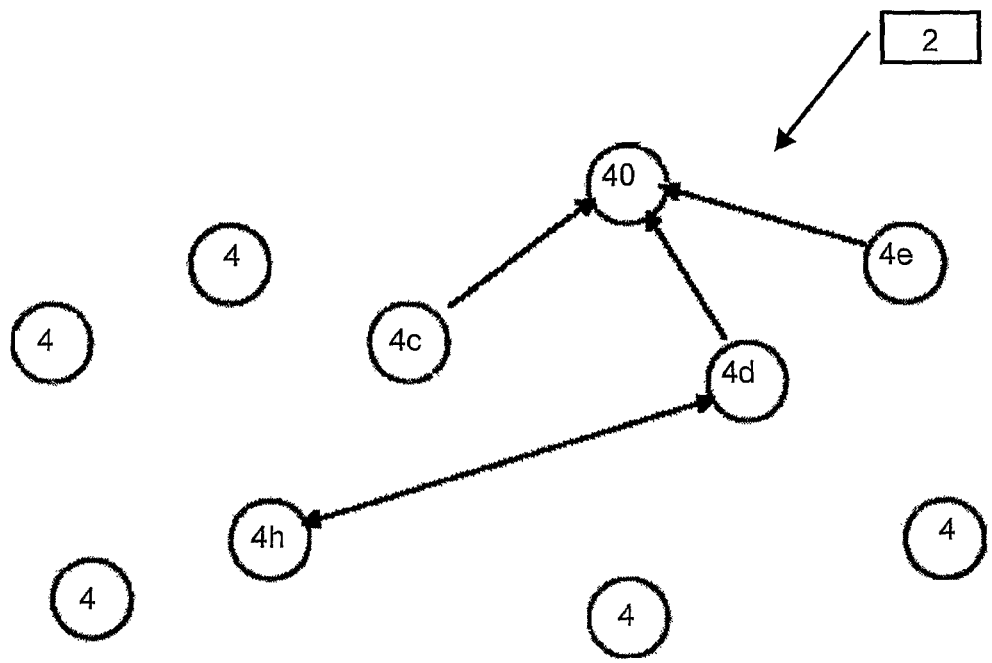
FIG. 2 is a schematic block diagram of a plurality of mesh networked RF Tags in a virtual fence according to the teachings of the present invention.
Figure 3:
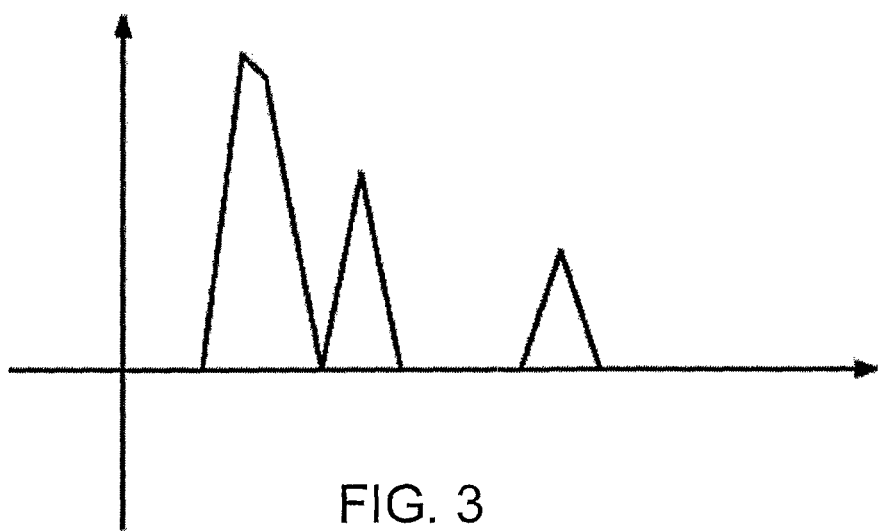
FIG. 3 is a schematic graphic representation of the multipath components received by one RF Tag of the plurality of Tags in FIG. 2 when no disturbance is present within the area of the plurality of Tags.

The operation of the preferred embodiment is as follows. As illustrated in FIG. 2, each tag 4 in virtual fence 2 transmits packets to its neighboring tags 4. The neighboring tags analyze the packet, as illustration by tag 40, and estimate the multipath properties from the received signal as seen in FIG. 3. The multipath properties are a function of the environment around the transmitter and the receiver. Some of the multipath components may be reflections from objects. The non-limiting example of FIG. 3 illustrates the multipath components received by tag 40 from its neighboring tags 4c, 4d and 4e. In a stable environment the multipath properties should remain substantially unchanged over time.

Figure 4:
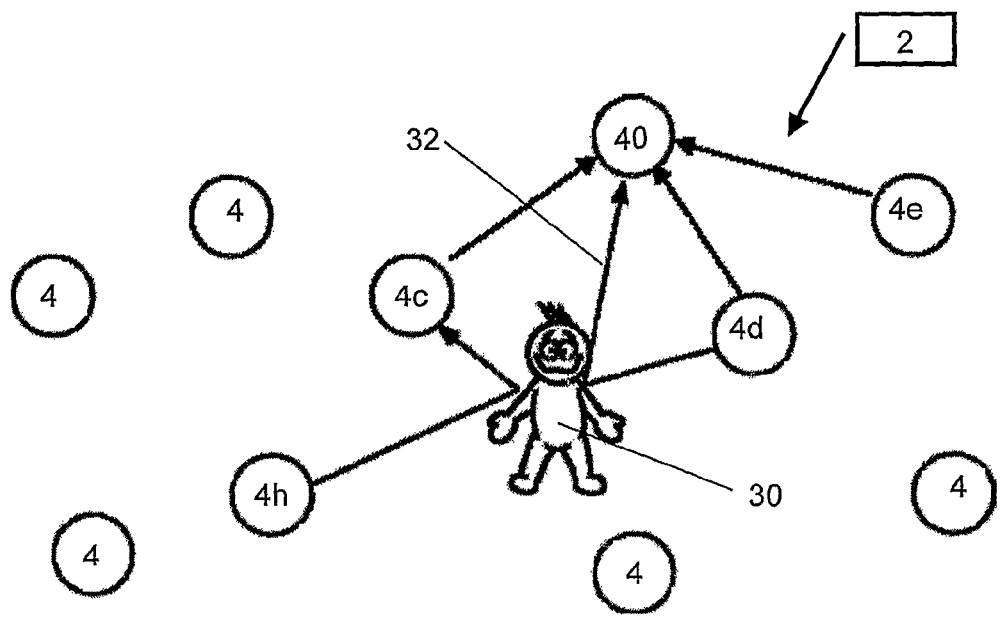
FIG. 4 is a schematic block diagram of the plurality of mesh networked RF Tags of FIG. 2, shown with an intruder.

In FIG. 4 an intruder 30 has entered the area of the virtual fence 2 and a new multipath component 32 is now being received by tag 40. It should be noted that a new multipath component will also be received by tag 4c and tag 4h will no longer be receiving the multipath component from tag 4d.

Figure 5:
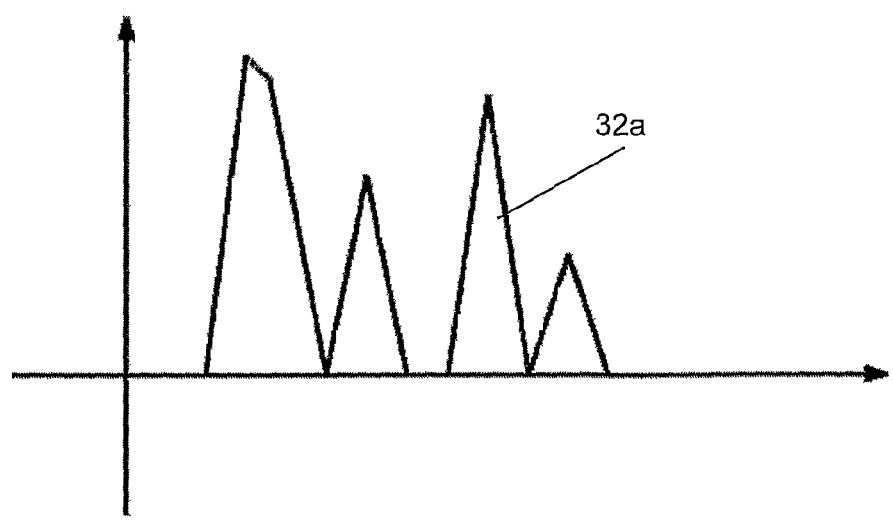
FIG. 5 is a schematic graphic representation of the multipath components received by the RF Tag of FIG. 3 when the intruder of FIG. 4 is present within the area of the plurality of Tags.

In one embodiment, each tag includes a Digital Signal Processor for analyzing the multipath properties. Alternatively, each tag 4 may use the mesh network to transmit the estimated multipath properties to a different tag that contains a DSP or up to a reader or control processor which analyzes the data. In the latter cases, it is advantageous that the tag have the minimal capabilities to differentiate between the current multipath and previously estimated multipath from same sender in order to save transmission bandwidth. The function of the DSP is to detect new multipath components or changing multipath components. As shown in FIG. 3, there is a multipath pattern before the intruder entered the area. After the intruder 30 entered the area of the virtual fence 2, FIG. 5 shows the newly created multipath component 32a being received by tag 40. In other cases, such as the communication between tags 4d and 4h, with no graph shown, the intruder will reduce a multipath component by blocking it. The DSP can estimate not only the presence of a disturbance, but also to classify it. The data collected in one tag is sufficient for estimating the size and the material of the object by observing the height of the multipath component. The rate of change in the multipath component is an indication of the speed of the object. For example it is possible to distinguish between rain, birds and a person. The rain will cause an overall decrease in power in all multipath components. The bird is too small to cause any change. A person will form a distinct new multipath component. A Vehicle will register as a much stronger multipath component than that of a person. The location and direction of movement of the object can be determined by intersecting the data from at least two tags, or by one tag that has collected multipath patterns from at least two transmitters. Upon detection of a disturbance within the mesh network, the Central Processing Unit (FIG. 1, 50) provides detailed information regarding the disturbance such as, but non-limited to, time of detection, location of detection, current location, estimated size of the object causing the disturbance, and direction and speed of travel through the mesh network that forms the virtual fence.

Figure 6:
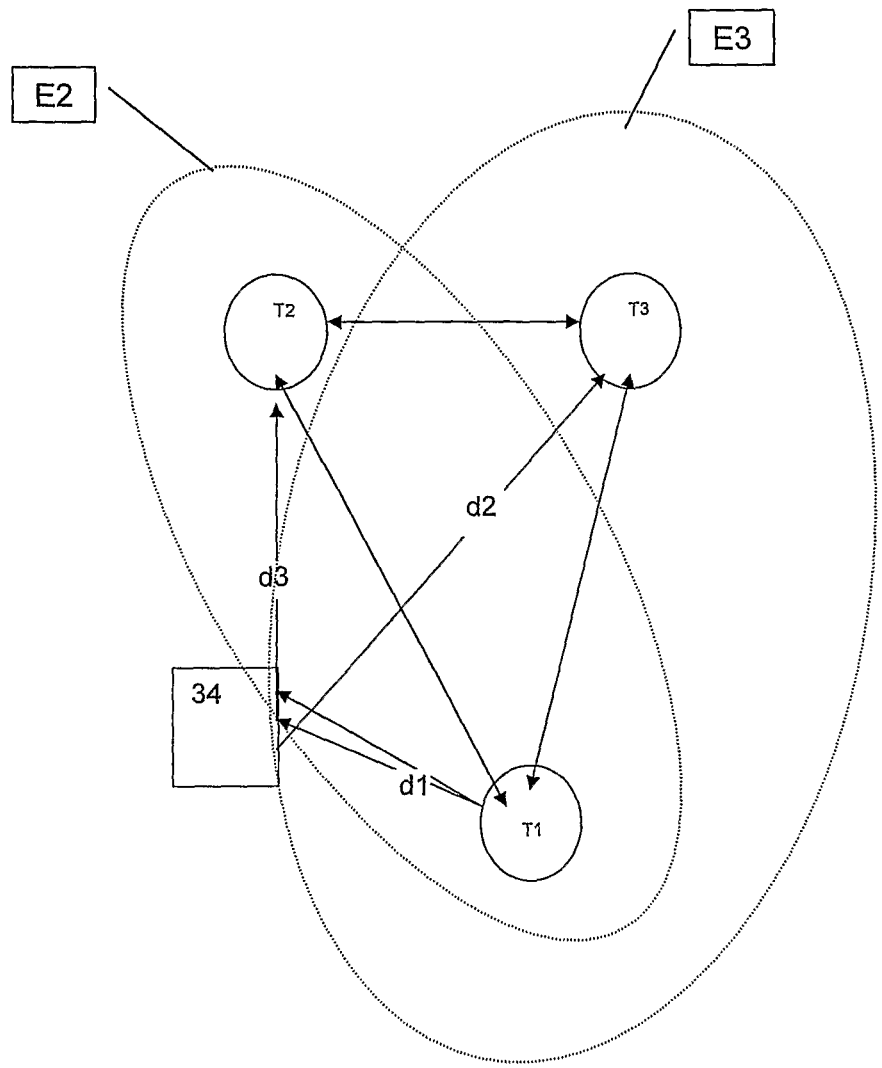
FIG. 6 is a schematic block diagram of a method for determining the location of the intruder of FIG. 4 according to the teachings of the present invention.

As illustrates in FIG. 6, if two tags T2 and T3 transmit their estimated multipath pattern to a transmitting tag T1, T1 can estimate the relative position of the object 34. Having the tags measure the relative distance between them and that a line of sight component exists between them, T3 can measure d1+d2 and T2 can measure d1+d3. This is based on receiving both the direct path from T1 as well as the reflected wave from the object 34.

Each of the measurements d1+d2 by T3 and d1+d3 by T2 describes an ellipse E2 and E3 respectively, the intersection of which gives the relative position of the object 34.

It will be obvious that the two ellipses intersect at two points which can provide ambiguity in the position of object. Such ambiguity can be solved by adding information from additional tags or by transmitting also from T2 to T3 and measuring d2+d3.

In order to save power, the tags 4 may be configured with a distributed synchronization algorithm that puts all their active windows in an overlapping time frame. In order to limit the occurrence of collisions, the number of concurrent transmitting tags should be limited. For example each tag may be configured to transmit in a probability relative to its number of neighbors.

It is noted that the DSP algorithm described above is only an example. More advanced pattern recognition algorithms can be applied to better identify the object.

There is also an option to include additional sensors, at additional cost, and integrate their data.

It will be appreciated that the above descriptions are intended only to serve as examples and that many other embodiments are possible within the spirit and the scope of the present invention.

What is claimed is:

1. A system capable of monitoring an area and detecting a disturbance with the area, the system comprising a plurality of ultra-wide band radio frequency tags, each of said plurality of tags communicating with one or more neighboring tags, and each of said plurality of tags including a digital signal processing module configured to monitor changes in radio frequency multipath properties of received packets transmitted by at least one other of said one or more neighboring tags, said changes being caused by a disturbance indicative of an object in the vicinity of the tags.

2. The system of claim 1, wherein at least one from the group including at least one of said tags, at least one reader operatively associated with said plurality of tags and a central processor operatively associated with either said reader or said at least one tag, includes a pattern recognition module which classifies the object and determines a location of the object causing said disturbance based on said processes changes in radio frequency multipath properties.

3. The system of claim 2, wherein at least said central processor is configured to provide information to a user regarding said disturbance.

4. The system of claim 1, wherein a mesh network is formed between at least some of said plurality of tags.

5. The system of claim 4. wherein said mesh network includes at least one of a reader and a central processor operatively associated with said mesh network.

6. A method for detecting the entry of an object into a monitored area, the method comprising:
 (a) deploying a plurality of ultra-wide band radio frequency tags, each of said plurality of tags communicating with one or more neighboring tags and each of said plurality of tags including a digital signal processing module configured to monitor changes in radio frequency multipath properties;
 (b) monitoring, by at least one said tag, radio frequency multipath properties of received packets transmitted by at least one other of said one or more neighboring tags; and
 (c) determining if any changes in said frequency multipath properties have occurred.

7. The method of claim 6, further including classifying and determining a location of a disturbance causing said any changes in said frequency multipath properties using a pattern recognition module operatively associated with any one of at least one of said tags, a reader and a central processor each operatively associated with a mesh network.

8. The method of claim 7, wherein said determining a location of a disturbance causing said any changes in said frequency multipath properties is implemented using said frequency multipath properties from as few as two said tags.

9. The method of claim 6, further including forming a mesh network between at least some of said plurality of tags.

10. The method of claim 8, further including operatively associating at least one of, a reader and a central processor with said mesh network.

11. The system of claim 1 further comprising each of the plurality of tags configured to transmit data regarding one or more multipath components upon detecting one or more changes in radio frequency multipath properties of received packets.

12. The method of claim 6 further comprising transmitting, by at least one said tag, data regarding one or more multipath components upon determining one or more changes in radio frequency multipath properties of received packets.

13. The system of claim 1 further comprising each of the plurality of tags configured to transmit the changes in radio frequency multipath properties of received packets to a reader or a central processor associated with the plurality of tags;
 the reader or the central processor configured to:
  determine changes in a multipath pattern associated with the plurality of tags based on the changes in radio frequency multipath properties; and determine characteristics of the object causing the changes in the multipath pattern.

14. The method of claim 6 further comprising:

transmitting, by each of the plurality of tags, the changes in radio frequency multipath properties of received packets to a reader or a central processor associated with the plurality of tags;

determining, by the reader or the central processor, changes in a multipath pattern associated with the plurality of tags based on the changes in radio frequency multipath properties; and determining characteristics of the object causing the changes in the multipath pattern.

* * * * *